Dec. 25, 1923.
S. E. LANE
1,478,611
COLLAPSIBLE BED FOR AUTOMOBILES
Filed Dec. 20, 1921    3 Sheets-Sheet 1
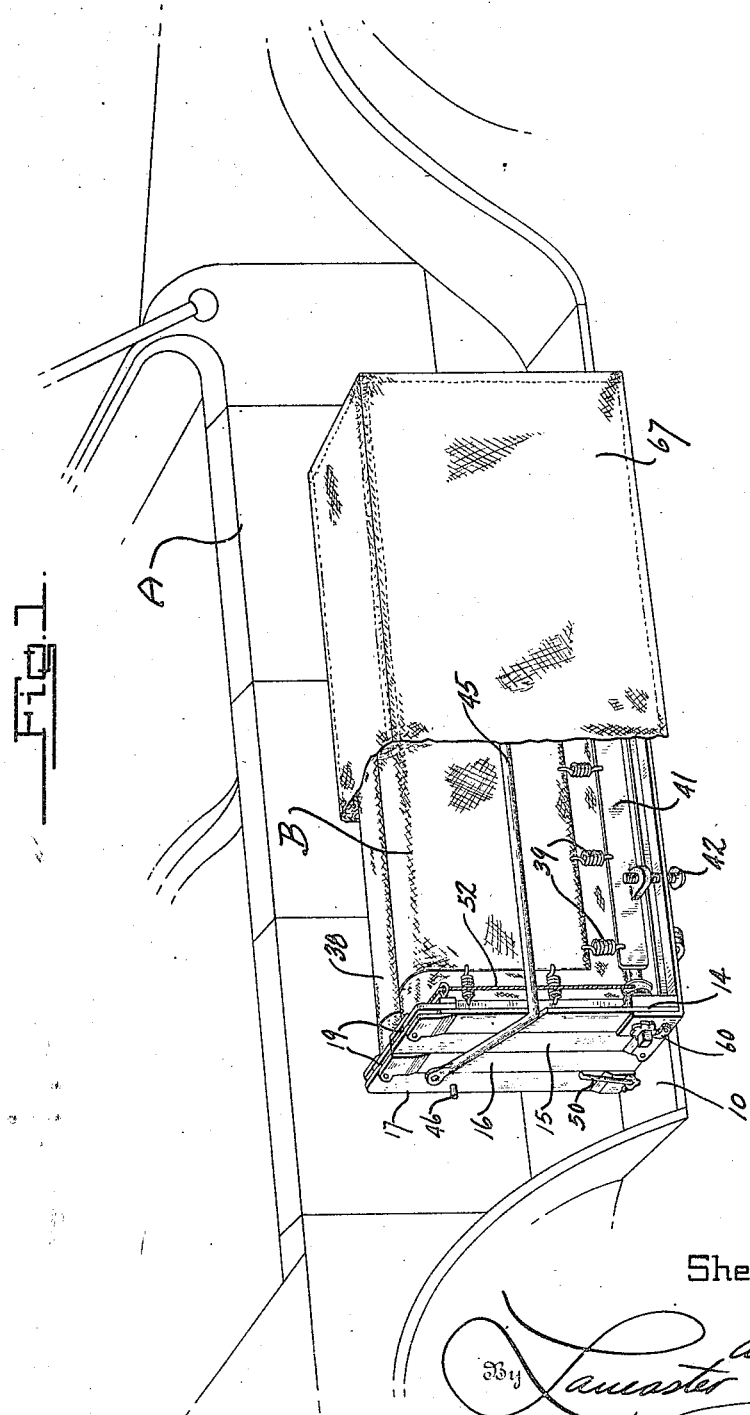
Inventor
Sherman E. Lane
By Lancaster and Allwine
Attorney Dec. 25, 1923.
S. E. LANE
COLLAPSIBLE BED FOR AUTOMOBILES
Filed Dec. 20, 1921
1,478,611
3 Sheets-Sheet 2
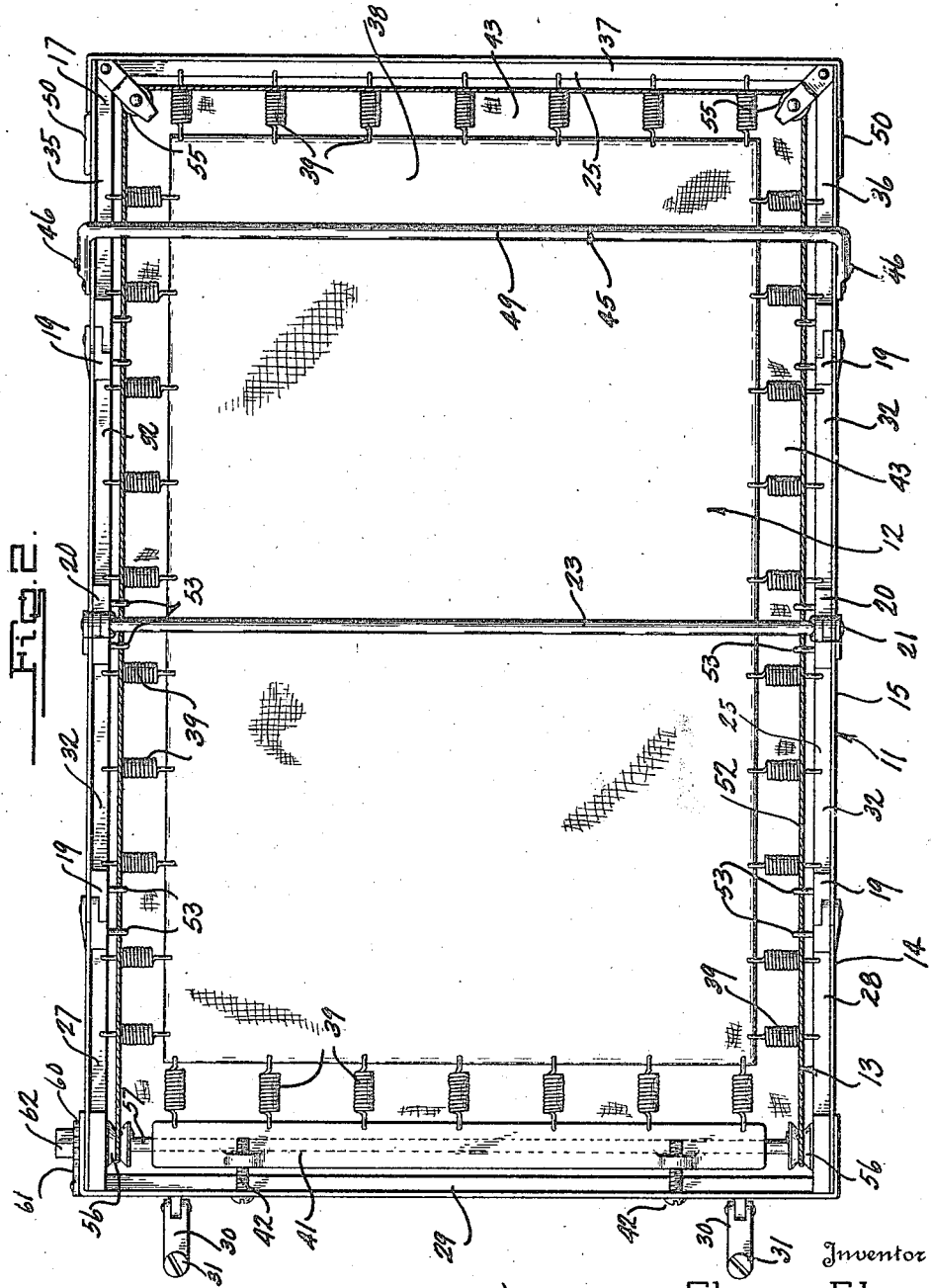
Inventor
Sherman E. Lane
By Lancaster Allwine
Attorneys

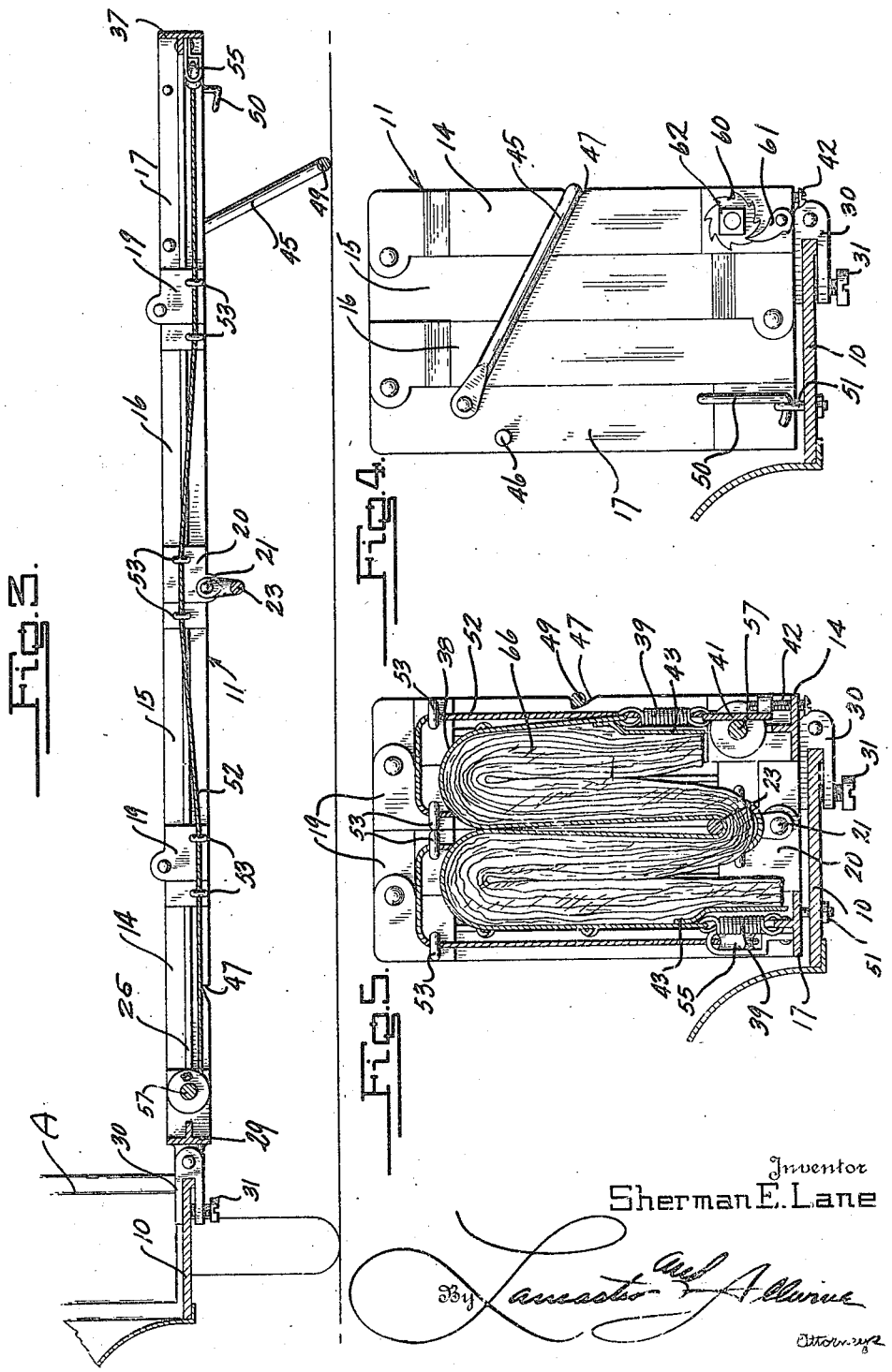

Patented Dec. 25, 1923.

1,478,611

UNITED STATES PATENT OFFICE.

SHERMAN E. LANE, OF CANON CITY, COLORADO.

COLLAPSIBLE BED FOR AUTOMOBILES.

Application filed December 20, 1921. Serial No. 523,717.

*To all whom it may concern:*

Be it known that I, SHERMAN E. LANE, a citizen of the United States, residing at Canon City, in the county of Fremont and State of Colorado, have invented certain new and useful Improvements in Collapsible Beds for Automobiles, of which the following is a specification.

This invention relates to collapsible beds adapted for use in connection with automobile vehicles, and whereby convenient sleeping provisions may be made for campers, tourists and the like.

A further object of the invention is the provision of a collapsible bed adapted for practical mounting upon the running board of an automotive vehicle, in a manner which will permit of the carrying of a full sized bed in a simple and compact manner.

A further object of the invention is the provision of a collapsible bed for use upon automobiles, and which may be conveniently mounted upon the running board thereof in an accessible manner and whereby the same may be quickly extended in a facile manner.

A further object of the invention is the provision of an improved means for rigidly maintaining the collapsible bed in rigid extended position.

Other objects and advantages will be apparent during the course of the following detailed description.

In the accompanying drawings, forming a part of this specification, and wherein similar reference characters designate corresponding parts throughout the several views:

Figure 1 is a perspective view of a portion of an automobile, showing the improved bed collapsed upon the running board thereof, several parts of the improved bed having been shown in fragmentary perspective, in order to show the cooperation of the details.

Figure 2 is a bottom plan view of the improved bed in extended position.

Figure 3 is a longitudinal cross sectional view taken through the improved bed in its extended position, and showing the association thereof with the running board of a motor vehicle.

Figure 4 is an end view of the improved bed showing the same collapsed in portable condition upon the running board of an automobile.

Figure 5 is a cross sectional view taken through the folding bed in its collapsed position upon the running board of an automobile.

In the drawings, wherein for the purpose of illustration is shown a preferred embodiment of my invention, the letter A designates an automotive vehicle having the improved bed B mounted thereon.

The automotive vehicle A may be of any type, and includes some supporting surface for holding the bed B, such as the horizontal running board 10.

The bed B principally comprises a frame structure 11; support 12; and strengthening means 13. The frame 11 is of novel construction, and is preferably divided into four sections 14, 15, 16 and 17. The end sections 14 and 17 are hingedly connected to the intermediate sections 15 and 16 respectively by the hinge structures 19, which are so formed as to permit the hinged sections to swing upwardly. On the other hand, the intermediate sections 15 and 16 are hingedly connected by hinge structures 20 in such manner that said intermediate frame sections 15 and 16 swing downwardly when folding upon each other. The pivot point 21 of each hinge structure 20 is preferably formed of the outturned end of a U-shaped rod 23, which transversely spans the under surface of the bed B, in order to add lateral rigidity to the same. The inside surfaces of the frame sections 14, 15, 16, and 17 are provided with a shelf or web 25, which extends peripherally about the interior surface of the frame 11 and cooperates with the bed support 12 to be subsequently described.

The frame section 14 is of U-shaped construction, including the lateral rail pieces 27 and 28 and the transverse rail 29, said pieces 27, 28 and 29 being connected in rigid manner to provide the frame section 14. The outer surface of the transverse piece 29 is provided with the swinging clamp member 30 provided with adjustable screws 31 therein, said clamp members 30 being provided for detachably and adjustably engaging the running board 10 of an automotive vehicle A in a manner to support the bed B thereon. The intermediate sections 15 and 16, each include a pair of side rails 32, which are connected in hinged manner, as above described. The most forwardly extending section 17, which is of course, positioned remote from the automotive vehicle A when the frame 11 is extended, is substantially U-shaped, similar to the frame section 14 and includes the side rail pieces 35 and 36, which are rigidly connected by a transverse rail piece 37.

Referring now to the support means 12, the same includes a flexible supporting member or floor 38, such as canvas, which is provided about its marginal edges with the spiral tension springs 39. The springs 39 are adapted for engaging the web portions 25 of the frame 11, and thus resiliently support the flexible member 38 in lieu of the ordinary bed springs. The resilient springs 39 adjacent the forward rail portion 29 of the section 14 are in engagement with a movable strip 41 which is adjustably connected by screws 42 to said rail 29. Thus by rotation of the screws 42, the strip 41 can be moved to place additional tension upon the various spiral springs 39 for stretching the flexible member 38. If desired, marginal strips of flexible material 43 may be provided to project from the marginal edges of the flexible support member 38, and whereby the springs 39 may be hidden or covered.

A U-shaped supporting leg or member 45 is pivotally connected to the outer surfaces of the rails 35 and 36 upon the outer frame section 17. This supporting member 45 is adapted for engaging a ground surface, and cooperates with the running board 10, in supporting the bed B in extended position substantially as illustrated in Figures 2 and 3. The member 45, when the bed B is extended, contacts the stop pins 46 projecting outwardly from the frame section 17. The supporting member 45, however, serves an additional function, in that the same supports the frame sections 14 to 17 inclusive, in a collapsed position, when the bed B is folded upon the running board 10. The manner in which this member acts as a locking lever to support the bed in collapsed position is illustrated in Figure 4, certain notches 47 being provided in the under marginal edge of the pivoted frame section 14 for receiving the transverse portion 49 of the lever 45, and as can readily be seen from the drawings. When the frame sections are in their folded and collapsed positions upon the running board 10, the hooks 50 which are pivoted to the outer surface of the rails 35 and 36 of the frame section 17 are in position to swing into the eye bolts 51, which are attached upon the running board 10, and as illustrated in Figures 4 and 5 of the drawings.

In order to provide an absolutely rigid extension of the frame sections, a steel cable 52 has been provided, which is threaded through eye bolts 53 mounted upon the interior surface of the frame sections and particularly upon each side of the pivot point of the hinged connections of said frame sections. The cable 52 is supported upon the outer portion of the forward frame section 17 by the pulley structures 55, which are disposed in the corners of said frame section 17, and as can readily be seen from the drawings. The ends of the cable 52 are wound over sheaves 56 mounted for rotation upon a shaft 57, which is rotatably mounted in the pivotally connected frame section 14; extending parallel to and adjacent the rail piece 29. A ratchet wheel 60 is provided upon the shaft 57 for rotation therewith and cooperates with a pawl 61 to maintain the shaft 57 in a predetermined position. A squared stem 62 of the shaft 57 extends outwardly from the frame 11, for reception of a socket wrench, or the like, to effect rotation of the shaft 57 for tensioning the cable 52 disposed over the sheaves 56. As noted from Figure 3 of the drawings, the guide staples 53 are positioned in such manner adjacent a hinge of the frame 11, that they are in alignment, one staple 53 being positioned upon each of the rail pieces which are pivotally connected by said hinge member. The alignment of the guide members 53 is such that the cable 52 is threaded therethrough, remote from the pivot point of the hinge member and as can easily be seen form Figure 3.

In operation, assuming the frame sections to have been unfolded from the running board 10, the same are rigidly positioned to provide a stable structure by rotation of the shaft 57, in manner above described, and whereby the steel cable 52 is drawn taut, and thus locking the hinges 19 and 20, so to speak, in order that the frame sections 14 to 17 inclusive are secured in alignment and the canvas support member 38 stretched for receiving bed clothing.

When it is desired to collapse the extended bed B, the ratchet wheel 60 is tripped by swinging of the pawl member 61, thus releasing tension upon the cable member 52. The outer portion 17 is then swung upwardly and positioned upon the intermediate frame section 15 and which movement is permitted because of the slack within the cable 52. The frame sections 16 and 17 are then folded upon the intermediate frame section 16 by reason of under pivotal movement of the hinges 20, the last movement in the collapsing of the frame sections being that of folding the already collapsed frame sections 15, 16 and 17 upon the pivotally connected frame section 14. The frame sections are then swung upwardly upon the pivot members 30 and whereby the frame sections are placed upon the running board 10 in vertical position, substantially as illustrated in Figures 1, 4, and 5. The supporting member 45 is then swung into position whereby the transverse piece 49 engages in the notches 47, and locking the frame section in folded collapsed position. In order to more securely attach the collapsed bed B upon the running board 10, the hooks 50 are then swung to engage their bolts 51 and thus locking the bed B upon the running board 10 for transportation, and against liability of accidental displacement. This folding of the bed B may be effected with the bed clothing 66 folded within the collapsed bed B and intermediate the vertically positioned frame sections, and as illustrated in Figure 5. A cover 67 or the like, is provided for slipping over the collapsed bed B when it is positioned upon the running board 10, to protect the same against dust, dirt and inclement weather. If desired, any suitable tent structure may be attached to the bed when it is in extended position, and suitably connected to the automotive vehicle A to protect the occupants of the bed from exposure.

From the foregoing, it can be seen that a simple, compact and practical working structure has been provided, so constructed as to meet the demand placed upon the same. By forming the bed into four frame sections they can be vertically positioned upon the running board in as compact a position as possible. By vertically positioning the same, the frame sections are of such length as to permit the provision of a full sized bed when the same is extended. The provision of the supporting member 45 is particularly valuable, in that the transverse supporting portion 49 which engages the ground, is of such length as to provide a good hinge bearing support for the bed B, and in contra-distinction to ordinary leg members, which would readily sink into the soil.

Various changes in the shape, size and arrangement of parts may be made to the form of the invention herein shown and described, without departing from the spirit of the invention or the scope of the claims.

I claim:

1. An automobile bed comprising a plurality of collapsible frame sections, cable means for maintaining said frame sections in extended relation, and means hingedly connecting said bed to an automotive vehicle.

2. A bed for automotive vehicles comprising a collapsible frame including a plurality of sections, and adjustable cable means for holding said frame sections in extensible position.

3. A collapsible bed comprising a plurality of frame sections, and adjustable cable means engaging said sections upon their inside surfaces to secure said sections in extensible position, or to permit folding thereof.

4. A collapsible bed comprising a frame including a plurality of hinged connected sections, a U-shaped member pivotally connected to one of said collapsible sections and adapted for engaging said sections to hold them in collapsed position, said U-shaped member adapted for swinging to act as a supporting member when said collapsible sections are in extended position to provide a bed frame.

5. A folding bed comprising a frame formed of a plurality of hingedly connected sections, means hingedly connecting one of said frame sections to the running board of an automotive vehicle, and a U-shaped member connected to another of said frame sections and adapted for use as a frame locking member when the frame sections are collapsed, said U-shaped member adapted to serve as a supporting leg when the frame sections are in extended position.

6. An automobile bed comprising a frame formed of a plurality of hingedly connected sections, a U-shaped member hingedly connected to an end frame section, a frame section remote from that section which supports the U-shaped member having notches therein for receiving the portion of said U-shaped member to lock the frame sections in collapsed position, and stop pins on said frame section which support said U-shaped member, said pins adapted for receiving said U-shaped member to support the same in position to act as a leg when said frame is in extended position.

7. In a device of the class described, the combination of a plurality of hingedly connected frame members, means hingedly connecting one of said frame sections to the running board of an automotive vehicle, a U-shaped member hingedly connected to another of said frame sections most remote from said frame section which is pivoted to the running board, said U-shaped member adapted for serving as a supporting leg when the frame is in extended position or provided to serve as a locking member when the frame sections are collapsed, and cable adjusting means for maintaining said sections in stable position.

8. A folding bed comprising a plurality of frame sections, means hingedly connecting said frame sections, guide eyes on the frame sections adjacent said hinged connecting means, a cable supported in the guide eyes, drum winding means receiving said cable, and means for rotating said drum winding means to adjust the cable thereon for supporting said frame section in stable position.

9. A collapsible bed for automotive vehicles comprising frame sections, means for connecting said frame sections, means hingedly connecting said frame sections to the running board of an automobile whereby the same may be vertically positioned thereon when in collapsed position, a cable, means on said frame sections for receiving said cable, a shaft rotatably suported by said frame adjacent said running board, drums on said shaft, a ratchet on said shaft, a pawl pivotally mounted on said frame, said shaft adapted for rotation to wind the cable on said drums and whereby the same may be drawn taut for extending said frame sections to provide a bed.

10. A collapsible bed for automotive vehicles comprising end sections and a pair of intermediate sections all of said sections being hingedly connected together, hinged clamping members upon one of said frame sections for pivotally mounting the collapsible frame to an automotive vehicle, a cable, means receiving the cable about the inside surfaces of said frame sections and supporting the same upon each side of the pivot point of said frame hinges, rotatable drum means on said frame for adjustment to draw said cable taut to hold the frame sections in stable position, a flexible support, means resiliently mounting said flexible support to said strip, means adjustably mounting said strip upon a frame section whereby said resilient means may be adjusted, a U-shaped supporting member pivotally connected to the frame section remote from the pivotal connection of said frame with an automotive vehicle, said U-shaped member adapted for acting as a supporting leg when the frame is in an extended position, or for acting as a locking arm to hold said frame sections in collapsed position upon said automotive vehicle, and hook means for supporting said frame sections in secure position upon an automotive vehicle.

11. A bed comprising a plurality of foldable frame sections, a cable supported about said frame sections, and drum winding means for said cable supported by said bed for winding the cable thereon to position said sections in extensible rigid relation or permit their collapsible positioning.

SHERMAN E. LANE.